May 8, 1928.
R. C. JEFFERSON
1,668,810
FRICTION DRAFT GEAR
Filed Jan. 10, 1927
2 Sheets-Sheet 1
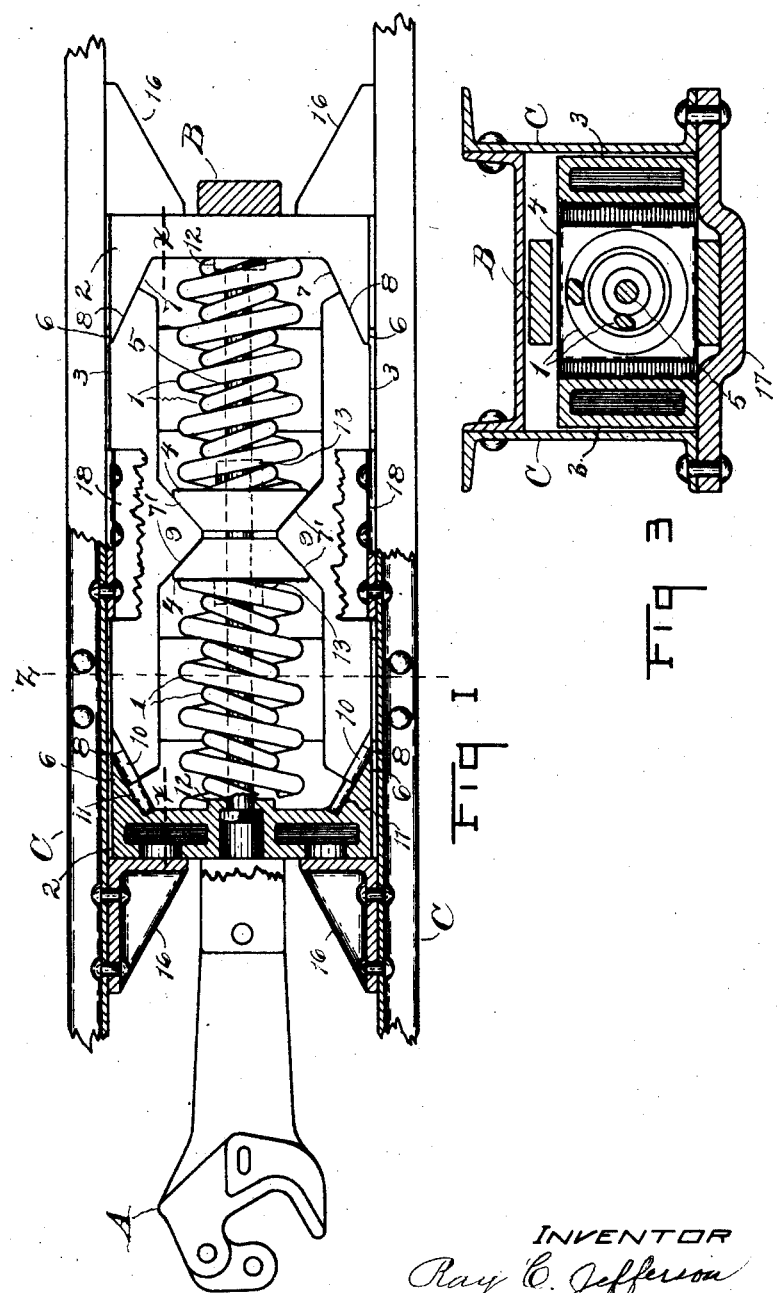
INVENTOR
Ray C. Jefferson
By Victor E. Randall
Atty.

May 8, 1928.
R. C. JEFFERSON
1,668,810
FRICTION DRAFT GEAR
Filed Jan. 10, 1927
2 Sheets-Sheet 2
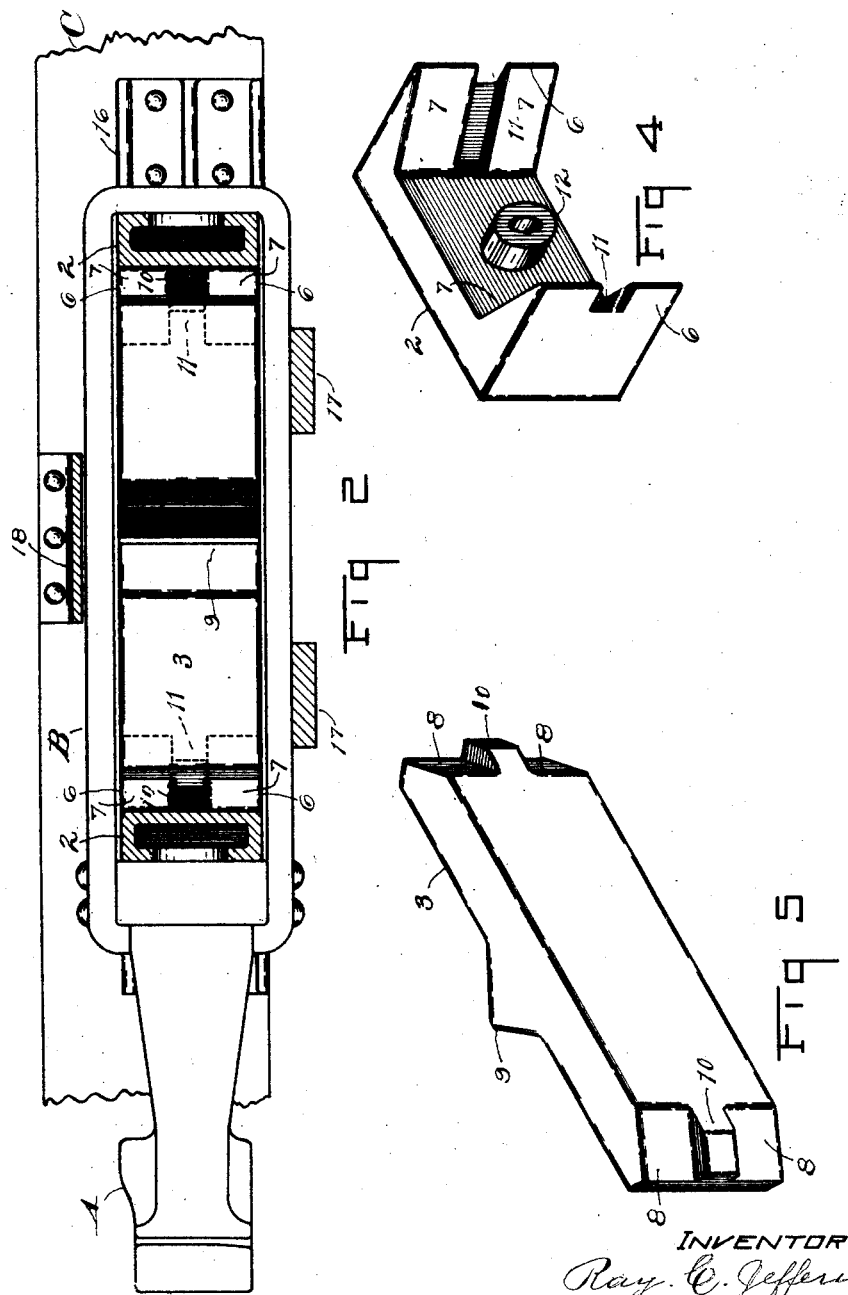
INVENTOR
Ray. C. Jefferson
By Victor E. Randall
Atty.

Patented May 8, 1928.

1,668,810

UNITED STATES PATENT OFFICE.

RAY C. JEFFERSON, OF BATTLE CREEK, MICHIGAN.

FRICTION DRAFT GEAR.

Application filed January 10, 1927. Serial No. 160,124.

The present invention has reference to friction draft mechanism for railway cars.

Among the other objects of my invention is to construct a mechanism for the purpose wherein tandem springs are arranged between friction draft plates so that in either pulling or buffing on the gear, both springs will respond with equal facility and effect very high frictional resistance upon said draft plates.

Another object of my invention is to effect the greatest possible frictional resistance co-acting with spring compression.

Still another object of my invention is to construct a draft gear for the purpose capable of withstanding heavy duty with simplified parts.

Another important object of the present invention is to so construct the parts that enter into a thoroughly efficacious device for the purpose, whereby said parts will not only be few in number but where two parts effecting a like purpose will be interchangeable. Still another object of my invention is to minimize the cost for producing patterns and dies for producing the simplified, staunch and interchangeable parts that enter into its construction.

Other objects of my invention are to so form the parts whereby the same can be readily assembled and durable. These and other objects and advantages will be readily comprehended by an ordinary artisan and by railway mechanics in particular.

In the drawings forming a part of this specification—

Fig. 1 is a plan view of my improved draft gear in a housing, parts of both said gear and housing being in section.

Fig. 2 is a longitudinal sectional elevation of my improved friction draft gear with the draw head, compression springs and their assembly rod removed, looking toward the left on the line $x$ of Fig. 1.

Fig. 3 is a vertical cross section of my improved friction draft gear taken on the line $z$, of Fig. 1, looking toward its center.

Fig. 4 is a perspective view of a friction end follower.

Fig. 5 is a perspective view of a friction side member.

Like marks of reference refer to corresponding parts in the different views, in which A, is a coupler, B, an ordinary riveted yoke, and C, channel iron car sills between which a housing is formed for the installation of the draft gear, the housing not materially differing from certain constructions as at present in use.

As shown in the drawings, the draft gear for the most part comprises double compression twin springs 1, and six friction elements: viz. two end followers 2, two oppositely disposed friction side members 3, two intermediate friction shoes 4, and a centrally disposed and longitudinally fitted assembly rod 5. The end followers 2, are duplicates and have end extensions 6, which upon their outer sides are disposed at right angles to the outer faces of said followers, and upon their inner faces bevel toward the common center.

Between the end followers and in close proximity to the car sills C, either side of the draft gear, the friction side members are also duplicates, the one being capable of substitution for the other. As shown in the drawings the outer faces of these friction members when in a normal relaxed position, are approximately alined with the outer end faces of the follower extensions 6, the ends of these members upon their inner faces 7, being beveled to correspond with the inner beveled surfaces 8, of said end extensions. Centrally of the members 3, and disposed in facing relation, raised friction ribs 9, are formed. These ribs extend transversely across the members 3, and are formed with tapering faces to coincide with the beveled oppositely disposed faces 7', of the friction shoes 4.

As a means for facilitating the assembly of the draft gear, the friction side members 3, have centrally disposed ribs 10, extending from the outer to the inner surfaces of said members, and these ribs are disposed to play within correspondingly formed grooves 11 in the beveled surfaces of the end followers 2. The intermeshing of a rib 10, within a groove 11, is to provide a keeper for the parts at their junction; more especially to prevent the one from vertical displacement with the other.

Abutting the beveled surfaces of the ribs 9, of the friction side members 3, oppositely disposed beveled surfaces of the friction shoes 4, are placed. These shoes have flattened outer surfaces and between said surfaces, and the inner walls of the end followers 2, double compression coil springs 1, are fitted. Preferably the springs where they abut the end followers and also the friction shoes 4, seat about centrally disposed bosses 12 and 13, respectively, a means tending to keep the springs centralized between the respective parts. As shown, the bosses 12, are cupped to receive the end heads of the assembly rod 5, extending longitudinally of the draft gear. The heads of this rod are such, that when the gear is fully extended, the heads of the rod will lie approximately near the bottoms of the cups formed in the bosses, so as to permit the gear to be fully compressed without the rod heads coming in contact with the yoke B, and the coupler; said rod, together with the grooves 11, of the follower ends 6, and the ribs 10, of the side members 3, forming a keeper or means for retaining a draft gear in proper position when placing or removing the same from a car.

A draft gear when assembled as set forth, and a yoke B, positioned about the same and carrying a draw-head A, is held in a housing between the car sills C, along its sides, and at its ends by lugs 16, top and bottom keepers being provided by means of a pair of bottom girts 17, attached to the bottom webs of the sills, and a top girt 18, respectively. These girts may be attached to the sills in any well known or approved manner, and as herein shown, are secured by means of rivets.

In operation, assuming the draw-head A, was forced rearward, a motion forcing the forward friction follower 2, also rearward and carrying the rear end of the yoke B, also rearward and away from the rear follower 2, at which time said latter follower will be forced against the rear lugs 16. As the forward follower 2, recedes from the forward lugs 16, the compression springs 1, will compress between the followers at both ends of the gear, and the friction shoes 4, forced in opposite directions by means of the beveled ribs 9, of the side members 3.

During such operation, the beveled faces of the end extensions 6, of the end followers 2, coinciding with the beveled ends of the side members 3, and the beveled surfaces of the shoes 4, bearing against the sloping sides of the ribs 9 of the side members, said side members will be forced inwardly toward one another in parallel position, at which time the compression springs 1, will be forced into smaller longitudinal compass by the relative approach of said end followers, together with the receding or separating movement of the friction shoes 4, forced apart by said ribs 9, of the side members 3, a reversal of the process ensuing when the draw-head is restored to a normal or relaxed position, and a re-acting of the process when the draw-head is pulled to a point forward of a relaxed position. From the foregoing explanation of the construction and operation of my improved draft gear, it will be understood that the compression springs 1, the friction end followers 2, the friction side members 3 and the intermediate friction shoes 4, respectively are duplicates; their formation being such that they can be assembled into a compact, staunch and thoroughly efficacious mechanism for the purpose by an ordinary artisan.

The arrangement and functioning of the parts, provides a draft gear capable of operating perfectly in the distribution of a load, whether acted upon by thrust or recoil, and so proportioned to receive an impact, that it will minimize a shock and effectually cushion said impact to its maximum without injurious effect to the mechanism of the draft gear and its housing.

I am aware that minor details might be resorted to in carrying out my invention without sacrificing any of its advantages, and I therefore reserve the right to so proportion, design and carry out my invention in any manner compatible with the objects set forth and so specified in the description forming a part of the specification and enumerated in the appended claims, wherein I claim:

1. In a draft gear, the combination with tandem compression coil springs, a friction follower abutting the outer end of each of said springs, inwardly projecting oppositely faced beveled extensions formed at the ends of said followers, spaced oppositely disposed friction side members interposed between said followers and bearing upon the beveled surfaces of the extensions of said followers, said side members having centrally arranged tapering sided friction ribs, a friction shoe having corresponding beveled surfaces coinciding with the tapering ribs of said members placed on both sides of said ribs the outer faces of said shoes bearing upon the inner ends of said springs, whereby when said friction followers are moved toward one another said shoes will be moved vice versa, and said side members will be moved toward one another in parallel arrangement and said spring will be compressed.

2. In a draft gear, the combination with tandem compression coil springs, a friction follower abutting the outer end of each of said springs, said followers having inwardly facing projections at their ends with inwardly tending beveled surfaces, spaced oppositely disposed friction side members interposed between said followers, said side members having beveled ends abutting the beveled surfaces of the projections of said followers and formed upon their intermediate inner surfaces with beveled ribs, a friction shoe having corresponding beveled surfaces on opposite edges coinciding with and abutting the bevel of a rib of both said side members on each side of said ribs, said followers having central bosses about which the opposite ends of said springs are received, said springs being compressed between the outer faces of said shoes and the inner walls of said followers by the moving of one follower toward another and co-active simultaneous movement of said side members toward one another, spreading said shoes apart.

RAY C. JEFFERSON.